United States Patent
Tsuruya et al.

(10) Patent No.: US 12,393,337 B2
(45) Date of Patent: Aug. 19, 2025

(54) STORAGE SYSTEM

(71) Applicant: Hitachi, Ltd., Tokyo (JP)

(72) Inventors: Masahiro Tsuruya, Tokyo (JP); Takashi Nagao, Tokyo (JP); Tomohiro Yoshihara, Tokyo (JP)

(73) Assignee: Hitachi Vantara, Ltd., Yokohama (JP)

( * ) Notice: Subject to any disclaimer, the term of this patent is extended or adjusted under 35 U.S.C. 154(b) by 0 days.

(21) Appl. No.: 18/608,880

(22) Filed: Mar. 18, 2024

(65) Prior Publication Data

US 2025/0094046 A1    Mar. 20, 2025

(30) Foreign Application Priority Data

Sep. 20, 2023   (JP) .................. 2023-152114

(51) Int. Cl.
*G06F 3/06* (2006.01)

(52) U.S. Cl.
CPC .......... *G06F 3/0608* (2013.01); *G06F 3/0616* (2013.01); *G06F 3/0659* (2013.01); *G06F 3/0683* (2013.01)

(58) Field of Classification Search
CPC .... G06F 3/0608; G06F 3/0616; G06F 3/0659; G06F 3/0683
See application file for complete search history.

(56) References Cited

U.S. PATENT DOCUMENTS

| | | | |
|---|---|---|---|
| 11,210,032 B1 | 12/2021 | Nagao et al. | |
| 2008/0144079 A1* | 6/2008 | Pandey | H03M 7/30 358/1.15 |
| 2012/0260009 A1* | 10/2012 | Lu | G06F 3/0679 710/52 |
| 2016/0342545 A1* | 11/2016 | Arai | G06F 11/0727 |

* cited by examiner

*Primary Examiner* — Eric Cardwell
(74) *Attorney, Agent, or Firm* — Foley & Lardner LLP

(57) ABSTRACT

A storage system includes a controller and one or more storage devices, and the controller can compress data in different compression units, and collectively compresses data of one or a plurality of consecutive addresses in each compression unit of the different compression units. The controller receives write data, determines whether read of data stored in the one or more storage devices is necessary for compression of the write data by a first compression unit, determines compression of the write data in the first compression unit when read is not necessary, and determines compression in the first compression unit or compression in a second compression unit smaller than the first compression unit based on a remaining endurance of rewriting of the one or more storage devices when read is necessary.

12 Claims, 20 Drawing Sheets

FIG. 5

PDEV MANAGEMENT TABLE 401

| PDEV # 501 | CAPACITY 502 | STATE 503 | BELONGING PVOL # 504 | WRITABLE CAPACITY 505 | TOTAL WRITE CAPACITY 506 | SCHEDULED OPERATING TIME 507 | OPERATING TIME 508 |
|---|---|---|---|---|---|---|---|
| 1 | 3.2 TB | NORMAL | 1 | 5,840 TB | 642 TB | 43,800 h | 6,789 h |
| 2 | 3.2 TB | NORMAL | 1 | 5,840 TB | 645 TB | 43,800 h | 6,789 h |
| ... | ... | ... | ... | ... | ... | ... | ... |
| N | l.m TB | ABNORMAL | V | W | X | Y | Z |
| ... | ... | ... | ... | ... | ... | ... | ... |

FIG. 6

PVOL MANAGEMENT TABLE 402

| PVOL # 601 | USED CAPACITY / TOTAL CAPACITY 602 | RECOMPRESSIBLE DATA RATIO 603 | BELONGING LDEV # 604 | STATE 605 | REDUNDANT CONFIGURATION 606 | BELONGING PDEV # 607 | PVOL PAGE MANAGEMENT TABLE STORAGE ADDRESS 608 |
|---|---|---|---|---|---|---|---|
| 1 | 1.6 / 32.0 TB | 20% | 1, 3 | NORMAL | 1 PARITY | 1, 2, 3, 4 | 0xABCD... |
| 2 | 20.5 / 51.2 TB | 15% | 2, 4, 5 | NORMAL | 2 PARITIES | 5, 6, 7, 8 | 0xEFGH... |
| ... | ... | ... | ... | ... | ... | ... | ... |
| N | ab.c / de.f TB | g% | X | ABNORMAL | h PARITIES | Y | Z |
| ... | ... | ... | ... | ... | ... | ... | ... |

FIG. 7

LDEV MANAGEMENT TABLE 403

| LDEV # 701 | CAPACITY 702 | STATE 703 | BELONGING PVOL # 704 | LDEV PAGE MANAGEMENT TABLE STORAGE ADDRESS 705 |
|---|---|---|---|---|
| 1 | 2.0 TB | NORMAL | 1 | 0xABCD... |
| 2 | 4.0 TB | NORMAL | 2 | 0xEFGH... |
| ... | ... | ... | ... | ... |
| N | l.m TB | ABNORMAL | v | 0xWXYZ... |
| ... | ... | ... | ... | ... |

FIG. 8

| PVOL PAGE # | STATE | VALID LDEV PAGE COUNT | INVALID LDEV PAGE COUNT | IN-PVOL PAGE NEXT WRITE START ADDRESS |
|---|---|---|---|---|
| 1 | OPEN | 64 | 1 | 0x0100 |
| 2 | CLOSE | 123 | 45 | - |
| ... | ... | ... | ... | ... |
| N | FREE | - | - | - |
| ... | ... | ... | ... | ... |

PVOL PAGE MANAGEMENT TABLE

FIG. 9

LDEV PAGE MANAGEMENT TABLE (405)

| LDEV PAGE # (901) | STATE (902) | ALLOCATION DESTINATION PVOL PAGE # (903) | IN-PVOL PAGE START ADDRESS (904) | COMPRESSION UNIT (LDEV PAGE COUNT) (905) | COMPRESSED SIZE (906) | IN-COMPRESSION DATA PAGE # (907) |
|---|---|---|---|---|---|---|
| 1 | ALLOCATED | 1 | 0x0000 | 4 | 0x0080 | 3 |
| 2 | ALLOCATED | 1 | 0x0080 | 1 | 0x0020 | 1 |
| ... | ... | ... | ... | ... | ... | ... |
| X | UNALLOCATED | - | - | - | - | - |
| ... | ... | ... | ... | ... | ... | ... |

FIG. 10

| SEGMENT # | STATE |
|---|---|
| 1 | LOCKED |
| 2 | LOCKED |
| ... | ... |
| X | FREE |
| ... | ... |

BUFFER SEGMENT MANAGEMENT TABLE

FIG. 11

CACHE SEGMENT MANAGEMENT TABLE (407)

| SEGMENT # (1101) | STATE (1102) | DATA TYPE (1103) | ALLOCATION DESTINATION LDEV # (1104) | LDEV PAGE # (1105) |
|---|---|---|---|---|
| 1 | CLEAN | UNCOMPRESSED DATA | 1 | 101 |
| 2 | DIRTY | UNCOMPRESSED DATA | 5 | 84 |
| ... | ... | ... | ... | ... |
| X | FREE | - | - | - |
| Y | DIRTY | COMPRESSED DATA | 1 | 101, 102, 103, 104 |
| ... | ... | ... | ... | ... | ature
STORAGE SYSTEM

CLAIM OF PRIORITY

The present application claims priority from Japanese patent application JP 2023-152114 filed on Sep. 20, 2023, the content of which is hereby incorporated by reference into this application.

BACKGROUND OF THE INVENTION

1. Field of the Invention

The present invention relates to data compression in a storage system.

2. Description of the Related Art

In recent years, there is an increasing importance of a technology of generating new values by accumulating and analyzing enormous data represented by artificial intelligence (AI). This requires a storage system having sophisticated input/output (I/O) performance in order to analyze accumulated data in addition to accumulating enormous data.

Storage systems having sophisticated I/O performance include an all flash array (AFA) mounted with, in place of a hard disk drive (HDD), a solid state drive (SSD) having overwhelmingly sophisticated I/O performance as compared with the HDD. In general, the AFA is more expensive than a storage system mounted with a known HDD. This is because the price (bit cost) per unit capacity of the SSD is more expensive than that of the HDD. For this reason, the AFA decreases the bit cost by mounting a data reduction function such as compression.

Methods for improving the compression ratio include, as disclosed in U.S. Pat. No. 11,210,032, collectively compressing data and reading and decompressing all.

SUMMARY OF THE INVENTION

In U.S. Pat. No. 11,210,032, the unit of data compression is increased and the compression ratio is improved by collectively compressing data in order of writing. On the other hand, in an existing storage system, when the compression unit is to be extended, it is conceivable to extend the compression unit in units of logical block address (LBA) continuous data. At this time, when the compression unit is larger than the write data unit (host write unit) from a host, read-modify-write is required, but U.S. Pat. No. 11,210,032 does not consider a case of read-modify-write.

This read-modify-write increases the write amount to an SSD mounted in the storage system, thereby decreasing the rewriting endurance of the SSD. This is because the non-volatile semiconductor device mounted on the SSD has an upper limit on the number of rewrites, and when this upper limit is exceeded, data cannot be read or written. Therefore, when the data compression unit is increased, the rewriting endurance of the SSD decreases.

A storage system of an aspect of the present invention includes: a controller; and one or more storage devices, in which the controller can compress data in different compression units, and collectively compresses data of one or a plurality of consecutive addresses in each compression unit of the different compression units, and the controller receives write data, determines whether read of data stored in the one or more storage devices is necessary for compression of the write data by a first compression unit, determines compression of the write data in the first compression unit in a case where the read is not necessary, and determines compression by the first compression unit or compression by a second compression unit smaller than the first compression unit based on a remaining endurance of rewriting of the one or more storage devices in a case where the read is necessary.

One aspect of the present invention can improve a data reduction ratio and suppress endurance shortening of a storage device having a rewriting endurance.

BRIEF DESCRIPTION OF THE DRAWINGS

FIG. 5 is a diagram illustrating a configuration example of a PDEV management table;

FIG. 6 is a diagram illustrating a configuration example of a PVOL management table;

FIG. 7 is a diagram illustrating a configuration example of an LDEV management table;

FIG. 8 is a diagram illustrating a configuration example of a PVOL page management table;

FIG. 9 is a diagram illustrating a configuration example of an LDEV page management table;

FIG. 10 is a diagram illustrating a configuration example of a buffer segment management table;

FIG. 11 is a diagram illustrating a configuration example of a cache segment management table;

DESCRIPTION OF THE PREFERRED EMBODIMENTS

Figure 1:
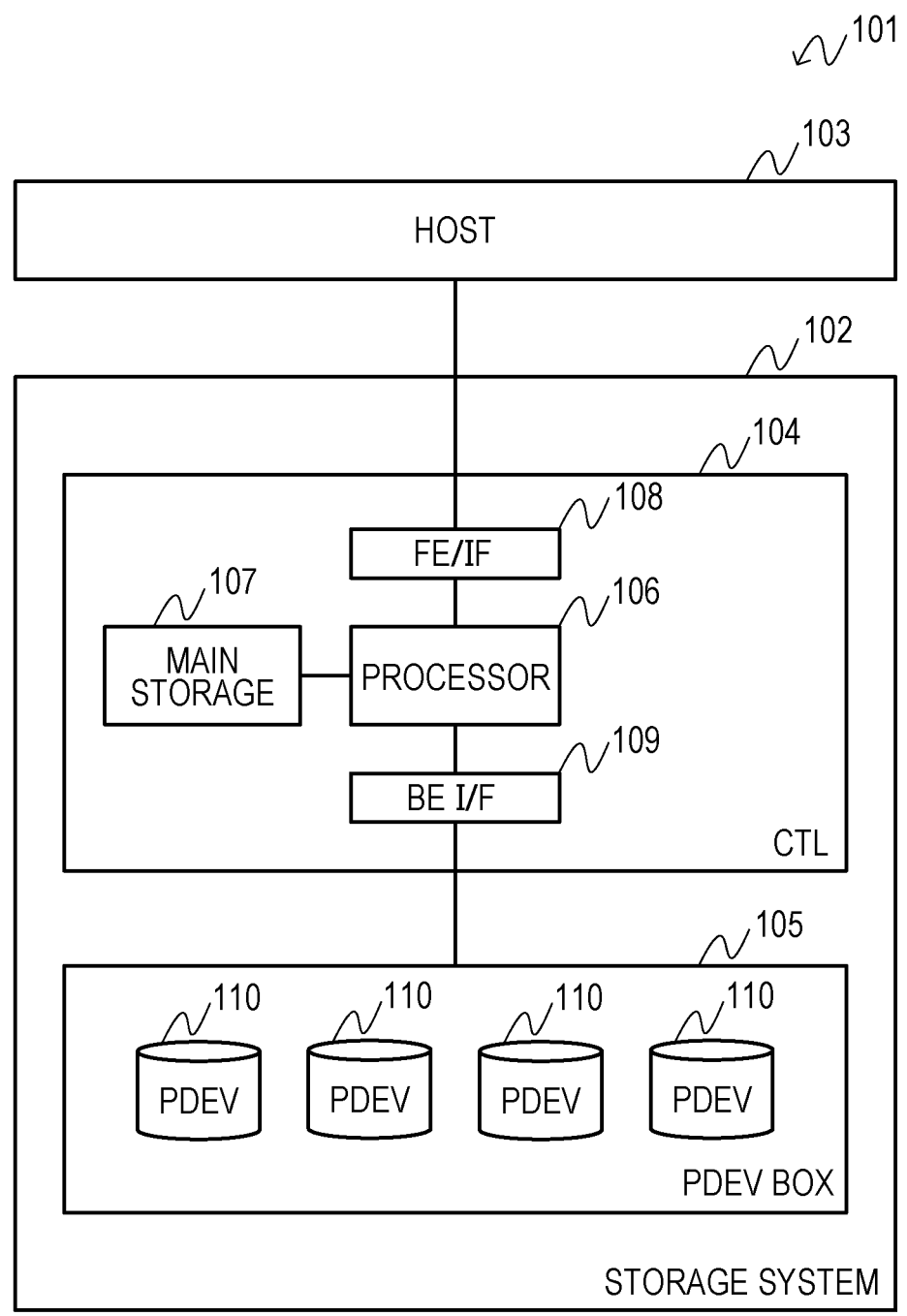
FIG. 1 is a diagram illustrating a configuration example of an information system including a storage system.

An example will be described below with reference to the drawings. Note that the example is merely an example for implementing the present invention, and does not limit the technical scope of the present invention.

In the following description, various types of information may be described with an expression of "xxx table", but the various types of information may be expressed with a data structure other than the table. The "xxx table" can be called "xxx information" to be indicative of not depending on the data structure.

In the following description, a number is used as identification information of elements, but another type of identification information (e.g., name or identifier) may be used.

In the following description, a common sign in a reference sign (or a reference sign) may be used when an explanation is made with the same type of elements being not distinguished from one another, and a reference sign (or an element ID) may be used when an explanation is made with the same type of elements being distinguished from one another.

In the following description, the "main storage" may be one or more storage devices including a memory. For example, the main storage may be at least a main storage device among main storage devices (typically a volatile storage device) and auxiliary storage devices (typically a nonvolatile storage device). The storage unit may include at least one of a cache area (e.g., a cache memory or a partial area thereof) and a buffer area (e.g., a buffer memory or a partial area thereof).

In the following description, "PDEV" means a physical storage device, and may typically be a nonvolatile storage device (e.g., an auxiliary storage device). The PDEV may be, for example, a hard disk drive (HDD) or a solid state drive (SSD).

In the following description, "RAID" is an abbreviation of redundant array of independent (or inexpensive) disks. A RAID group includes a plurality of PDEVs, and stores data in accordance with a RAID level associated with the RAID group.

In the following description, "PVOL" may include a plurality of PDEVs, and these PDEVs may constitute a RAID group.

In the following description, "LDEV" means a logical storage device, and includes some or all of "PVOLs", and a host executes an I/O request to the "LDEV".

A "write-once data structure" means a structure in which data after update is stored in a physical position different from that of data before update, and data is updated by changing a reference destination. Since the data size after compression varies depending on the content of the data before compression, in order to increase the efficiency of data reduction, it is necessary to store the data after compression in a PVOL (i.e., a PDEV corresponding to a PVOL) without a gap.

The "write-once data structure" can store, from the head, data after compression from an arbitrary position of the PVOL, and thus it is widely adopted in a storage system having a data reduction function such as compression. In the following description, the storage system has the "write-once data structure", and when an "LDEV" is updated with host write, the data after update is stored in a free area of the PVOL, and the data is updated by switching the reference destination of the data of the "LDEV".

Hereinafter, in a case where processing is described with a "program" as a subject, the subject of the processing may be a storage controller or a processor because the program is executed by a processor (e.g., a central processing unit (CPU)) included in a storage controller, whereby the program appropriately performs predetermined processing using a storage resource (e.g., main storage) and/or a communication interface device (e.g., HCA). The storage controller (CTL) may include a hardware circuit that performs part or the entire of processing. The computer program may be installed from a program source. The program source may be, for example, a program distribution server or a computer-readable storage medium.

In the following description, the "host" is a system that transmits an I/O request to a storage system, and may include an interface device, a storage unit (e.g., a memory), and a processor connected to them. The host system may include one or more host computers. At least one host computer may be a physical computer, and the host system may include a virtual host computer in addition to the physical host computer.

An example of a storage system that collectively compresses data of logical device units or logical device units and continuous logical block addresses (LBAs) will be described below. Note that the example described below does not limit the invention according to the claims, and all combinations of features described in the example are not necessarily essential to the solution of the invention.

In an example of the present description, two or more compression units (large and small) are selectively used. A write amount to an SSD is monitored, and a compression unit is selected based on a rewriting remaining endurance of the SSD. In an example, in a scheduled operating period of an SSD, it is determined whether or not the SSD reaches the rewriting endurance before reaching the scheduled operating period. When the result of the determination indicates that the SSD does not reach the endurance, the data reduction ratio is improved by performing data compression using a large compression unit (first compression unit). On the other hand, for a case where it is determined that the SSD reaches the endurance and read-modify-write is unnecessary, compression is performed using a large compression unit, and on the other hand, for a case where read-modify-write is necessary, compression is performed using a small compression unit (second compression unit). Note that other determination criteria may be used.

The monitoring of the write amount in the present example means statistical monitoring of the write amount. That is, the transition of the write amount is analyzed by continuously monitoring the write amount with respect to the SSD after the operation is started. As a result of this analysis, if a sign that the total write amount (506 in FIG. 5) exceeds the maximum writable capacity (505 in FIG. 5) allowed in the SSD is observed within the scheduled operating time arbitrarily determined for the SSD is observed, switching of the compression unit is executed and/or application/non-application of recompression processing is switched.

This can improve the data reduction ratio, and can reduce the bit cost of the all flash array (AFA). It is possible to suppress reduction in the endurance of the SSD by reducing read-modify-write associated with increasing of the compression unit with respect to write with the size less than the compression unit from the user, in other words, effectively using the data compression by the second compression unit having a compression unit smaller than the first compression unit. Note that three or more types of compression units having different sizes may be used. The SSD is a typical example of a storage device (also called a storage drive) in which a writable (rewritable) capacity (data amount) is set, and other storage devices having a rewriting endurance can be used in place of the SSD or together with the SSD.

FIG. 1 is a diagram illustrating a configuration example of an information system 101. The information system 101 includes one or more storage systems 102 and one or more hosts 103. The storage system 102 includes one or more controllers (CTLs) 104 and one or more PDEV boxes 105. In the present example, the storage system 102 has a configuration mounted with one CTL 104, but may have a configuration mounted with a plurality of CTLs to give the CTLs redundancy.

The PDEV box 105 includes one or more PDEVs 110. In FIG. 1, the CTL 104 and the PDEV box 105 are directly connected, but may be connected via a network. The CTL 104 includes a processor 106, the main storage 107, a front end interface (FE I/F) 108, and a back end interface (BE I/F) 109. The number of various elements constituting the CTL 104 may be one or more.

The processor 106 controls the entire CTL 104, and operates based on a microprogram stored in the main storage 107. The FE I/F 108 is controlled by the processor 106, and performs transmission and reception of an I/O request and I/O data from the host 103. The BE I/F 109 is controlled by the processor 106, and performs transmission and reception of data and the like with the PDEV 110 via the PDEV box 105.

Figure 2:
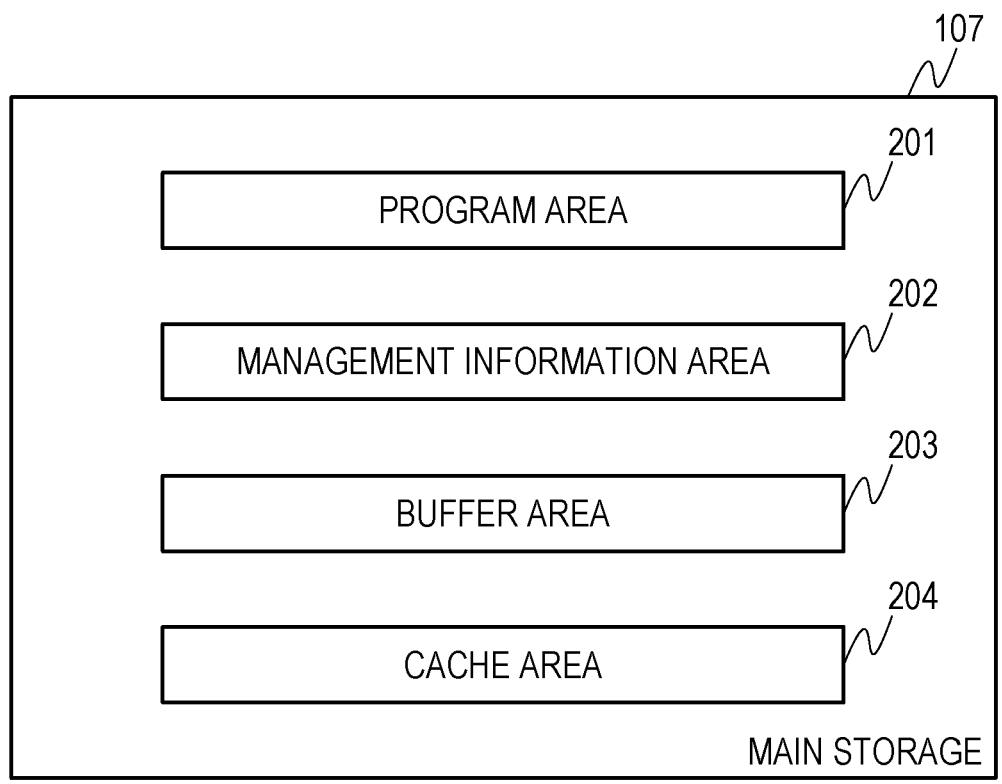
FIG. 2 is a diagram illustrating a configuration example of a main storage.

FIG. 2 is a diagram illustrating a configuration example of the main storage 107. In the main storage 107, a program area 201, a management information area 202, a buffer area 203, and a cache area 204 are secured.

The program area 201 is an area that stores each program for the processor 106 to perform processing. The management information area 202 is an area that is accessed from the processor 106 and stores various management tables. The buffer area 203 and the cache area 204 are areas that temporarily store data at the time of data transfer by the FE I/F 108, the BE I/F 109, and the like. Note that the buffer area 203 and the cache area 204 are configured by a plurality of segments (units in which an area is divided), and are managed in units of segments.

Figure 3:
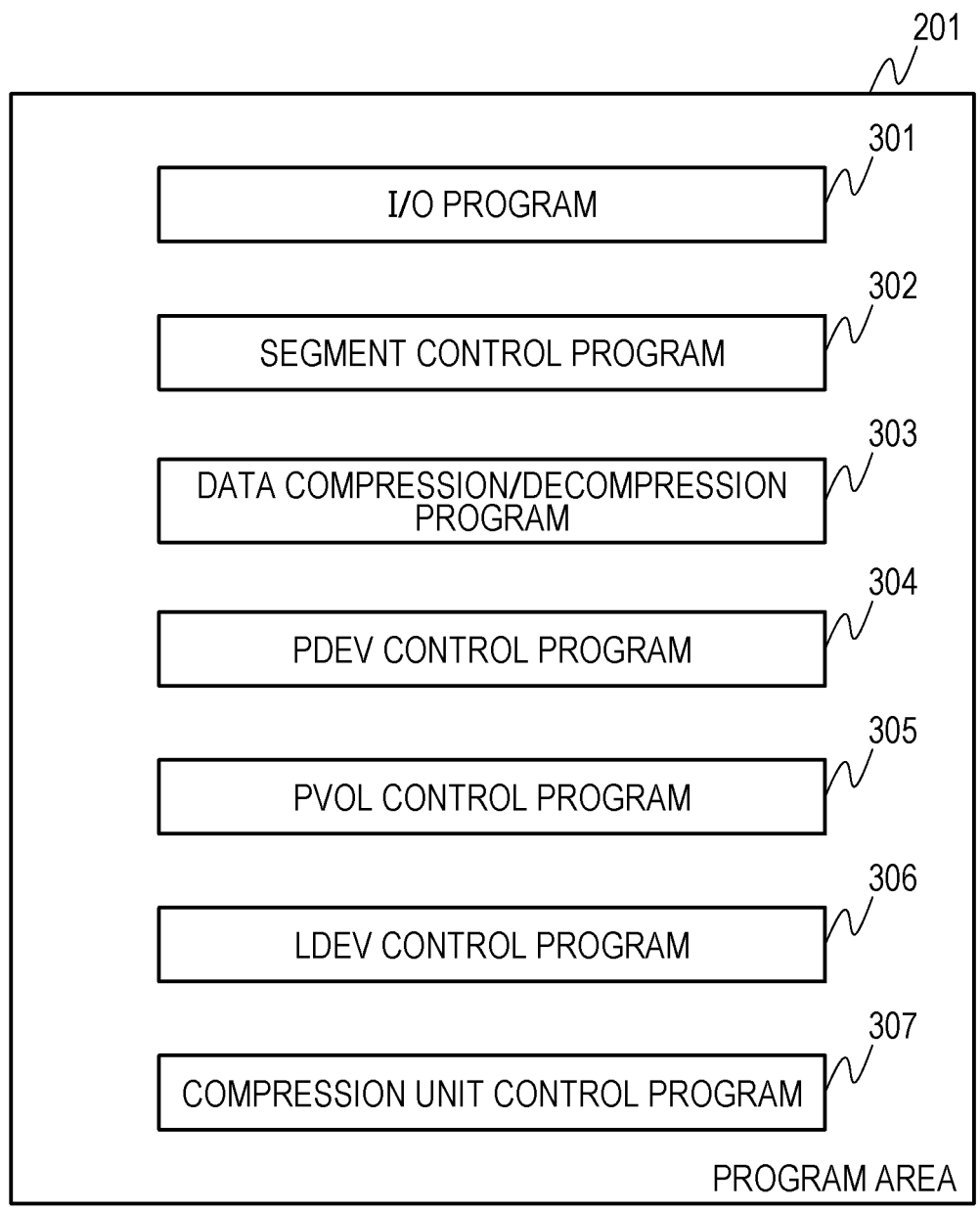
FIG. 3 is a diagram illustrating a configuration example of a program area.

FIG. 3 is a diagram illustrating an example of a program stored in the program area 201.

The program area 201 stores, for example, an I/O program 301, a segment control program 302, a data compression/decompression program 303, a PDEV control program 304, a PVOL control program 305, an LDEV control program 306, and a compression unit control program 307.

The I/O program 301 executes corresponding processing in accordance with an I/O request from the host 103. The segment control program 302 is called in a process in which the I/O program 301 performs processing on the I/O request, and secures and releases a buffer segment and a cache segment. The data compression/decompression program 303 is called in a process in which the I/O program 301 performs processing on an I/O request, and compresses data received from the host 103 or decompresses compressed data.

The PDEV control program 304 manages an area and a state of the PDEV 110 and controls transmission and reception of I/O data. The PVOL control program 305 controls an area, a state, and the like of the PVOL. The LDEV control program 306 controls an area, a state, and the like of the LDEV. The compression unit control program 307 controls the unit of compressing data and the like based on the rewriting endurance of the PDEV 110.

Figure 4:
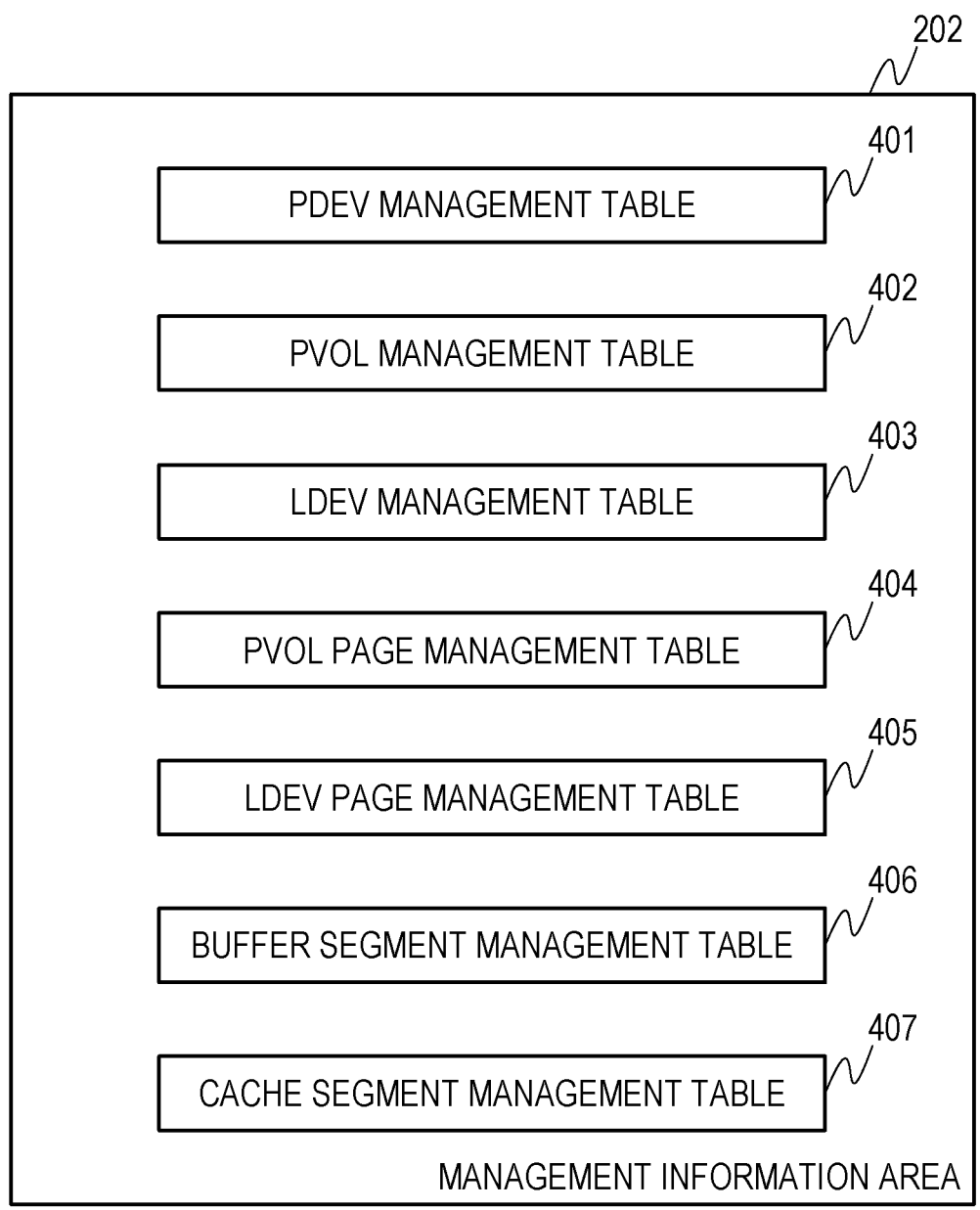
FIG. 4 is a diagram illustrating a configuration example of a management information area.

FIG. 4 is a diagram illustrating an example of information stored in the management information area 202. The management information area 202 stores a PDEV management table 401, a PVOL management table 402, an LDEV management table 403, a PVOL page management table 404, an LDEV page management table 405, a buffer segment management table 406, and a cache segment management table 407.

The PDEV management table 401 indicates a state of the PDEV 110 and a correspondence relationship with the PVOL of the PDEV 110. The PVOL management table 402 indicates a state of the PVOL, a correspondence relationship with the PDEV 110 of the PVOL, and a correspondence relationship with the LDEV of the PVOL. The LDEV management table 403 indicates a state of the LDEV and a correspondence relationship between the PVOL and the LDEV.

The PVOL page management table 404 is used to manage a page in which an area of the PVOL is divided by the unit capacity. The LDEV page management table 405 is used to manage a page in which an area of the LDEV is divided by the unit capacity. The buffer segment management table 406 is used to manage the segment of the buffer area 203. The cache segment management table 407 is used to manage the segment of the cache area 204.

FIG. 5 is a diagram illustrating a configuration example of a PDEV management table 401.

The PDEV management table 401 includes columns of a PDEV #501, a capacity 502, a state 503, a belonging PVOL #504, a writable capacity 505, a total write capacity 506, a scheduled operating time 507, and an operating time 508.

The PDEV #501 indicates an identifier of the PDEV 110. The capacity 502 indicates a capacity with which data of the PDEV 110 can be stored. The state 503 indicates a state in which the PDEV 110 is normal or abnormal (failure or reaching the rewriting endurance). The belonging PVOL #504 indicates to which PVOL the PDEV 110 belongs. The writable capacity 505 indicates a capacity (data amount) that can be written to the PDEV 110. Each cell constituting the SSD can write the data again by clearing written data (deleting data to make a free area), but a physical upper limit exists in the number of executable times of this operation.

Therefore, a value in which a design capacity of the SSD is multiplied by the number of executable times of this clear/write or a value similar thereto is set as the writable capacity (data amount) as a product endurance. The total write capacity 506 indicates the total capacity having been written to the PDEV 110 so far, in other words, it can also be defined as the total write amount starting from the operation start of the SSD. The scheduled operating time 507 indicates the total time during which the PDEV 110 is scheduled to operate. The operating time 508 indicates the total time during which the PDEV 110 operated.

FIG. 6 is a diagram illustrating a configuration example of a PVOL management table 402. The PVOL management table 402 includes columns of a PVOL #601, a used capacity/total capacity 602, a recompressible data ratio 603, a belonging LDEV #604, a state 605, a redundant configuration 606, a belonging PDEV 607, and a PVOL page management table storage address 608.

The PVOL #601 indicates an identifier of the PVOL. The used capacity/total capacity 602 indicates, of the PVOL, the used capacity in which data is already stored and the total capacity including the used capacity and the capacity in which data is not yet stored. The recompressible data ratio 603 indicates a ratio of data in which the compression ratio of the data can be improved by recompressing the data among the data stored in the PVOL.

The belonging LDEV #604 indicates an identifier (LDEV #) of the LDEV clipped from the PVOL. The state 605 indicates whether or not the state of the PVOL is normal. The redundant configuration 606 indicates an RIAD level of the PDEV 110 constituting the PVOL. The belonging PDEV 607 indicates an identifier (PDEV #) of the PDEV 110 constituting the PVOL. The PVOL page management table storage address 608 indicates an address on the main storage 107 that stores a table for managing a page in which the PVOL is divided by the unit capacity.

FIG. 7 is a diagram illustrating a configuration example of an LDEV management table 403. The LDEV management table 403 includes an LDEV #701, a capacity 702, a state 703, a belonging PVOL #704, and an LDEV page management table storage address 705.

The LDEV #701 indicates an identifier of the LDEV. The capacity 702 indicates a capacity with which data can be stored in the LDEV. The state 703 indicates whether or not I/O to the LDEV can be normally performed. The belonging PVOL #704 indicates the PVOL # to which the LDVE belongs. The LDEV page management table storage address 705 indicates an address on the main storage 107 that stores a table for managing a page in which the LDEV is divided by the unit capacity.

FIG. 8 is a diagram illustrating a configuration example of a PVOL page management table 404. The PVOL page management table 404 includes a PVOL page #801, a state 802, a valid LDEV page count 803, an invalid LDEV page count 804, and an in-PVOL page next write start address 805.

The PVOL page #801 indicates an identifier of the PVOL page. The state 802 is a state of the PVOL page, where open indicates being written (a state where data is stored partway in the PVOL page), close indicates having been written, and free indicates being not used.

The valid LDEV page count 803 indicates the number of LDEV pages storing valid data allocated to the PVOL page. The invalid LDEV page count 804 indicates the number of LDEV pages storing invalid data allocated to the PVOL page. One or more LDEV pages are allocated to one PVOL page, and in this example, a plurality of LDEV pages are allocated. The in-PVOL page next write start address 805 indicates a head address of an unwritten area from the head of the PVOL page in the PVOL page in which the state 802 is open.

FIG. 9 is a diagram illustrating a configuration example of an LDEV page management table 405. The LDEV page management table 405 includes an LDEV page #901, a state 902, an allocation destination PVOL page #903, an in-PVOL page start address 904, a compression unit (LDEV page count) 905, a compressed size 906, and an in-compression data page #907.

The LDEV page #901 indicates an identifier of the LDEV page. The state 902 indicates whether or not the LDEV page is allocated to the PVOL page. The allocation destination PVOL page #903 indicates a PVOL page # to which the LDEV page is allocated. The in-PVOL page start address 904 indicates a start address in the PVOL page storing compressed data including the LDEV page.

The compression unit (LDEV page count) 905 indicates a compression unit (the number of LDEV pages collectively compressed) used when data is compressed. The compressed size 906 indicates the size of compressed data including the LDEV page. The in-compression data page #907 indicates an identifier for specifying the LDEV page among the compressed data including the LDEV page.

FIG. 10 is a diagram illustrating a configuration example of a buffer segment management table 406. The buffer segment management table 406 includes a segment #1001 and a state 1002. The segment #1001 indicates an identifier of the buffer segment. The state 1002 indicates whether or not the buffer segment is secured (lock, free).

FIG. 11 is a diagram illustrating a configuration example of s cache segment management table 407. The cache segment management table 407 includes a segment #1101, a state 1102, a data type 1103, an allocation destination LDEV #1104, and an LDEV page #1105.

The segment #1101 indicates an identifier of the cache segment. The state 1102 indicates a state of the cache segment, where clean indicates that the PDEV has stored the latest data, dirty indicates that the data on the cache segment is the latest, and free indicates being not used.

The data type 1103 indicates whether or not the data stored in the cache segment is compressed or uncompressed. The allocation destination LDEV #1104 indicates the LDEV # to which the data stored in the cache segment belongs. The LDEV page #1105 indicates the LDEV page # in the LDEV # to which the data stored in the cache segment belongs.

Figure 12:
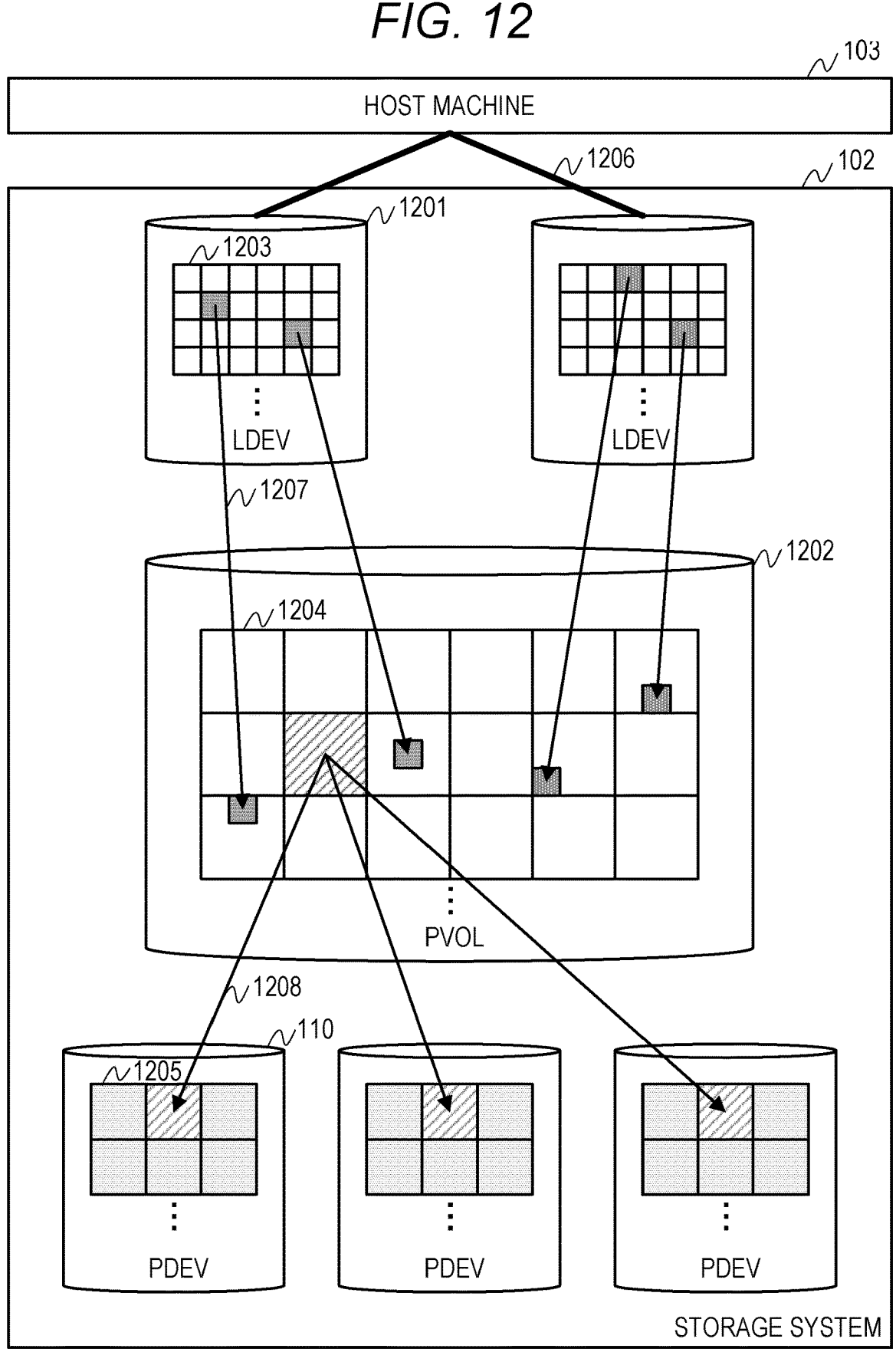
FIG. 12 is a diagram illustrating a relationship among an LDEV, a PVOL, and a PDEV in a storage system.

FIG. 12 is a diagram illustrating the correspondence relationship among the host 103, the LDEV, the PVOL, the PDEV 110, the LDEV page, and the PVOL page.

One or more LDEVs 1201 exist in the storage system 102 and provide an address space accessible from the host 103. A PVOL 1202 is a pool (address space) including one or more PDEVs 110. The LDEV 1201 includes one or more LDEV pages 1203. The PVOL 1202 includes one or more PVOL pages 1204. The PDEV 110 is divided into one or more areas 1205, and each area 1205 corresponds to one PVOL page 1204.

The host 103 is connected to one or more LDEVs 1201 (1206). The LDEV page 1203 is allocated to one or more PVOL pages 1204 (1207). The PVOL page 1204 is allocated to a divided area 1205 of one or more PDEVs 110 (1208).

Figure 13:
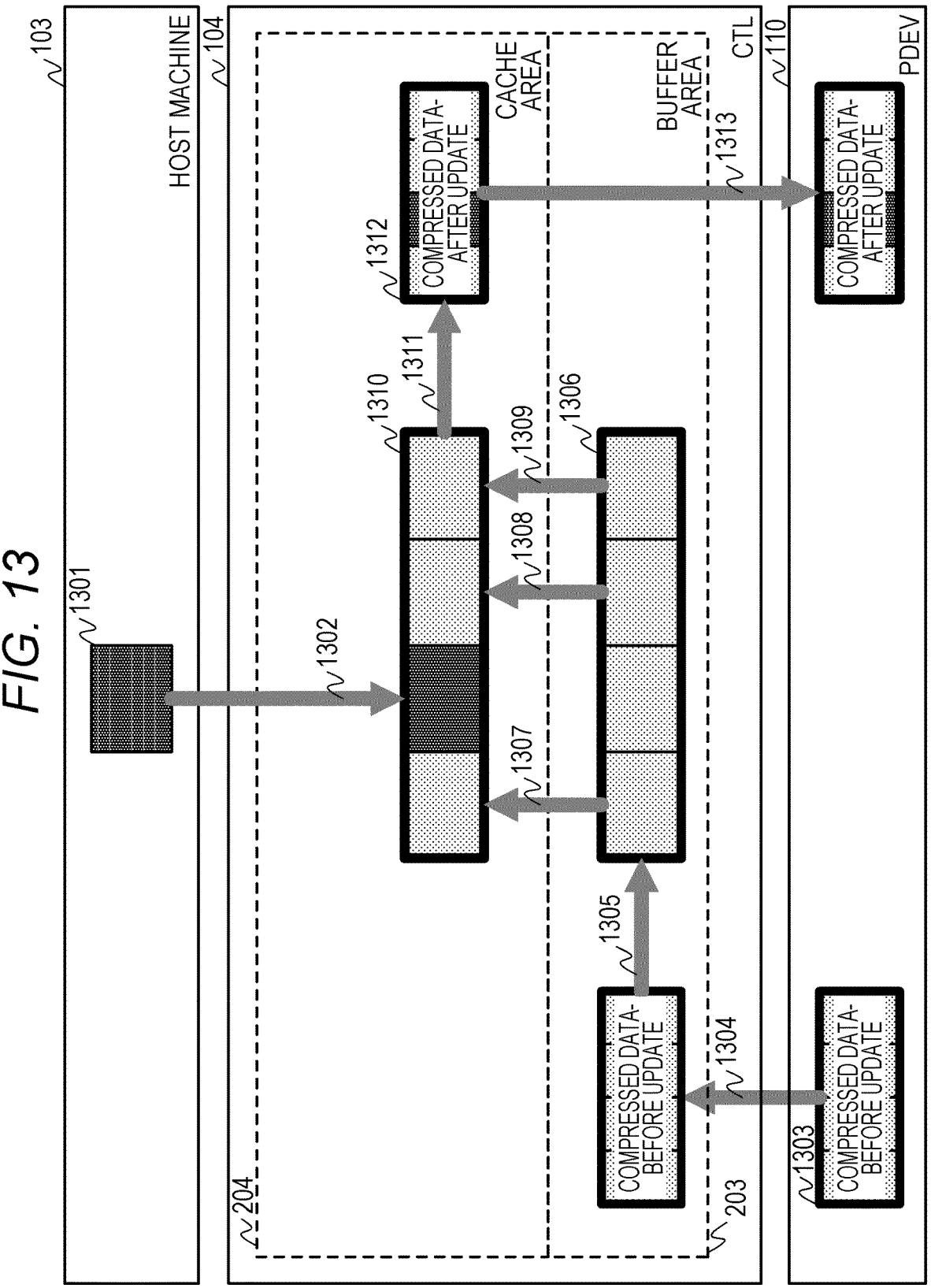
FIG. 13 is a diagram illustrating an example of a write data flow accompanied by RMW in a case where a large compression unit is used in the storage system.

An embodiment of the present description selectively uses a plurality of compression units having different sizes for write data from the host 103. An example of a write processing sequence using compression units of different sizes will be described below. First, FIG. 13 illustrates an example of the write processing sequence accompanied by read-modify for compression processing using a large compression unit in the storage system 102.

In order to describe the write processing sequence of data, this figure describes the constituent elements of the information system 101 partially omitted. The write data size from the host 103 is equivalent to the LDEV page 1203, and the compression unit is described as four LDEV pages 1203. The write data size is a data unit written from the host 103. The write data unit, that is, the address of the LDEV page is the LBA. Note that one LBA address may include a plurality of LBA pages.

In the following description, in the storage system 104, it is assumed that four items of data before compression of the LDEV page 1203 included in one item of compression data are mapped with fixed addresses so as to be LBA continuous. Due to this, the implementation of a program of address conversion does not become complicated and the size of the metadata used for address conversion can be reduced as compared with that corresponding to LBA discontinuity. Note that the four items of data before compression of the LDEV page 1203 need not be fixed as long as they are LBA continuous.

The host 103 writes data 1301 to the CTL 104 (1302). The write data is stored in the cache area 204. In order to compress the data, the CTL 104 reads compression data before update 1303 including the data from the PDEV 110

(1304). The CTL 104 stores the compression data-before update 1303 in the buffer area 203 and then decompresses it (1305).

The CTL 104 temporarily stores decompressed data 1306 in the buffer area 203, and transfers (read-modify) data other than the data 1301 to the cache area 204 (1307, 1308, and 1309). The CTL 104 compresses data 1310 after read-modify (1311). The CTL 104 temporarily stores compression data-after update 1312 in the cache area 204, and then transfers it to the PDEV 110 (1313). In this manner, in a case where the write data size is smaller than the compression unit, the read-modify-write occurs.

Figure 14:
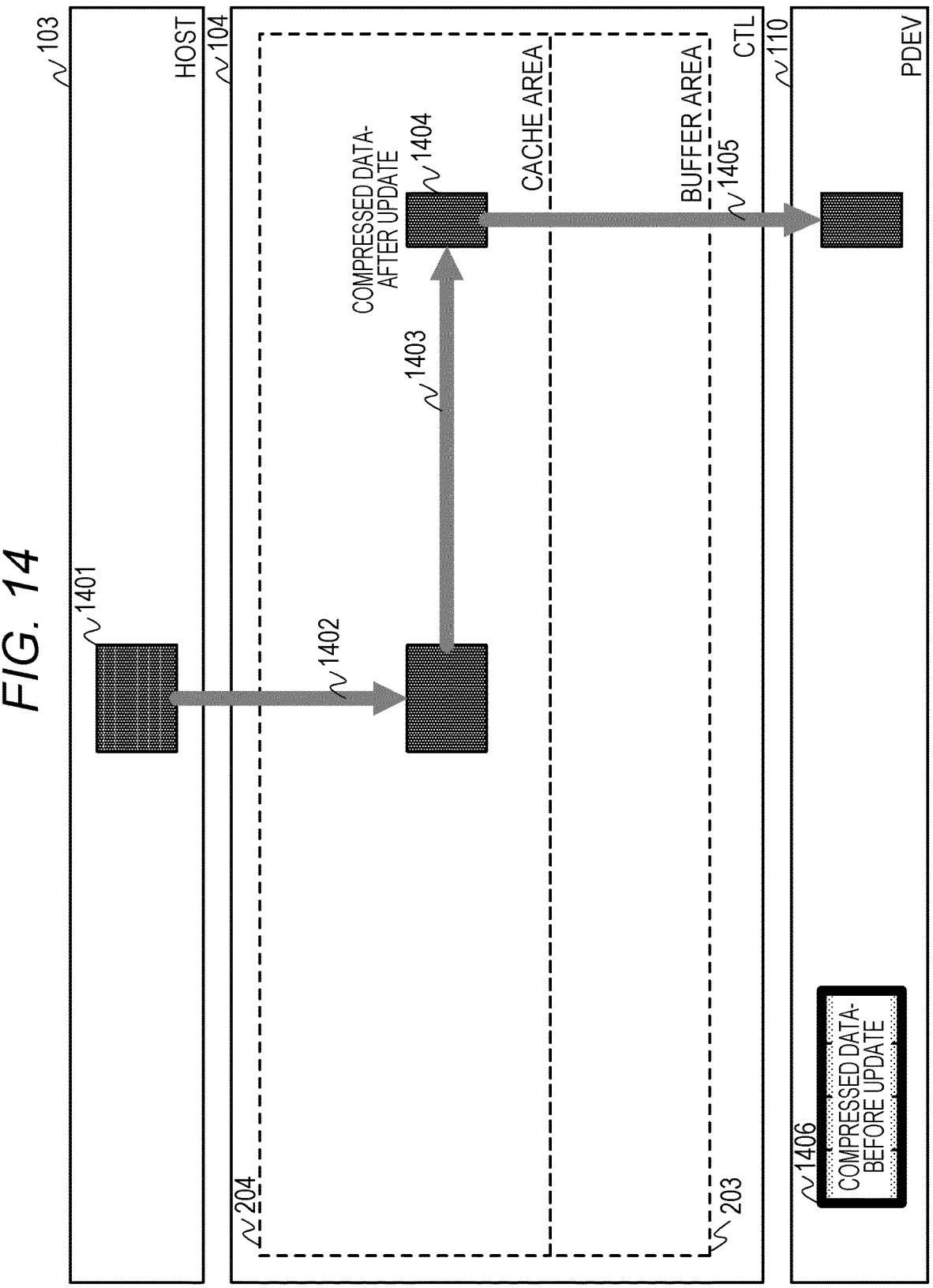
FIG. 14 is a diagram illustrating an example of a write data flow in a case where a small compression unit is used in the storage system.

FIG. 14 illustrates an example of a write processing sequence using a compression unit smaller than the compression unit illustrated in FIG. 13 in the storage system 0104. In order to describe the write processing sequence of data, FIG. 14 describes the constituent elements of the information system 101 partially omitted. In the write processing sequence described with reference to FIG. 14, a case in which the write data size from the host 103 is equivalent to that of the LDEV page 1203, and one LDEV page 1203 is used as the compression unit is described.

The host 103 writes data 1401 to the CTL 104 (1402). The write data is stored in the cache area 204 and compressed (1403). Thereafter, compression data-after update 1404 is transferred to the PDEV 110 (1405).

In this manner, by compressing the write data in the compression unit selected from a plurality of compression units, it is possible to reduce the write amount to the PDEV 110 without requiring read-modify of compression data-before update.

Figure 15:
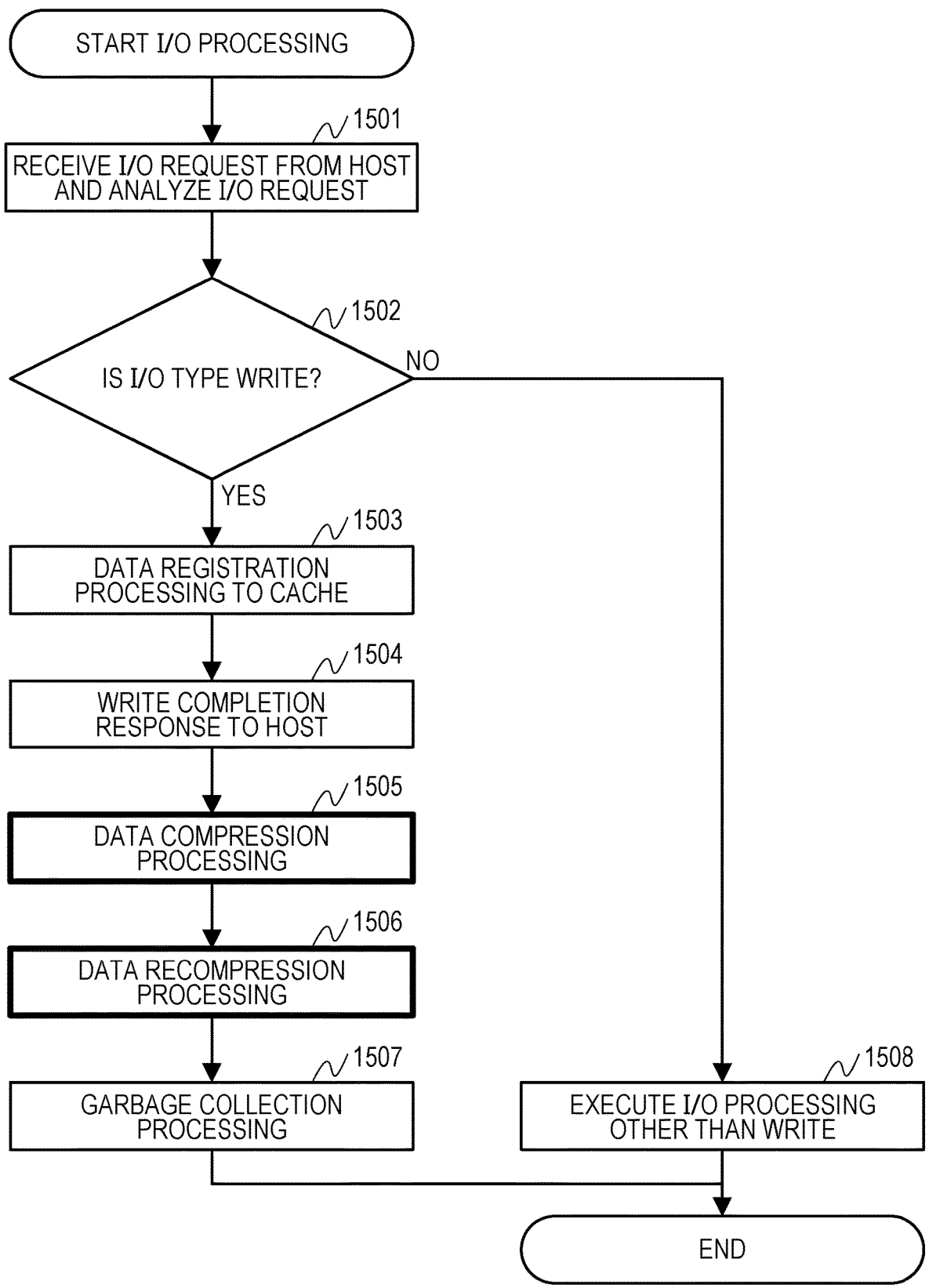
FIG. 15 is a flowchart showing an example of a processing flow based on an I/O request from a host in the storage system.

FIG. 15 is a flowchart showing an example of the flow in which the storage system 102 performs processing on an I/O request received from the host 103.

After receiving the I/O request from the host 103, the I/O program 301 of the CTL 104 analyzes the I/O request to clarify the I/O type (read, write, or others) and the like (1501).

By using the I/O type clarified in processing 1501 of analysis of the I/O request from the host, the I/O program 301 determines whether or not the I/O type is write (1502). When the I/O type is write (1503: Yes), the process proceeds to processing 1504 (A). On the other hand, when the I/O type is not write (1503: No), the process proceeds to processing 1510 (B).
(A)
After the segment control program 302 secures the cache segment, the I/O program 301 receives write data from the host 103 and registers the data in the cache (1503).

The I/O program 301 notifies the host 103 of completion of write (1504).

The I/O program 301 calls data compression processing in order to compress data (1505).

The I/O program 301 calls data recompression processing in order to improve the data compression ratio in the storage system 102 (1506).

In order to eliminate fragmentation in the PVOL page caused by log writing, the I/O program 301 calls garbage collection processing, executes the processing, and then ends the processing (1507).
(B)
After executing the processing based on the I/O request, the I/O program 301 ends the processing (1508). Here, since the processing is not affected by the present invention, detailed processing will not be described.

Figure 16:
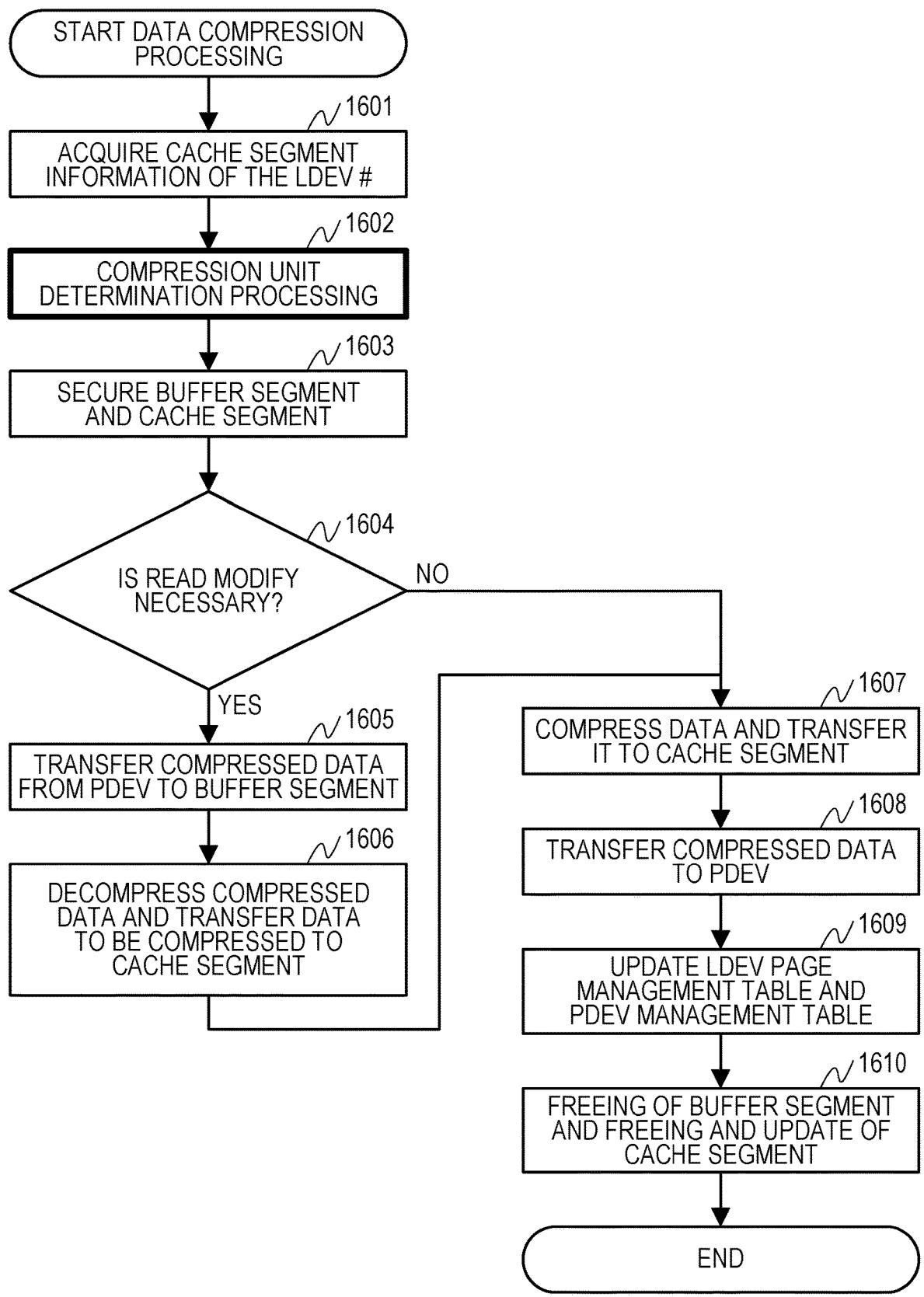
FIG. 16 is a flowchart showing an example of data compression processing in the storage system.

FIG. 16 is a flowchart showing an example of the flow of the data compression processing 1505 called from the flowchart described in FIG. 15.

With reference to the cache segment management table 407, the data compression/decompression program 303 acquires state information of a cache segment related to a write destination LDEV of the write data received from the host 103 (1601).

The data compression/decompression program 303 calls compression unit determination processing and receives a determination result of the compression unit (1602). In the example described below, it is assumed that one compression unit is selected from two compression units having different sizes. For example, a large compression unit is a 4-page LDEV page, and a small compression unit is a 1-page LDEV page. Details of the compression unit determination processing described later.

The segment control program 302 secures a free buffer segment and a free cache segment (1603).

The data compression/decompression program 303 determines whether or not read-modify is necessary based on the results of processing 1601 of acquiring the cache segment information of the LDEV # and the compression unit determination processing 1602 (1604).

When all data necessary for compression in the determined compression unit is included in the write data, read-modify is unnecessary. When read-modify is unnecessary, compressed old write data is discarded without being updated, and compression data including new write data is stored in the free area of the PVOL. When the determined compression unit is a small compression unit, read-modify is unnecessary. When the determined compression unit is a large compression unit, in a case where part of data of compression target is stored in the PDEV 110, read-modify is necessary, and otherwise, read-modify is unnecessary.

When read-modify is necessary (1604: Yes), the flow proceeds to processing 1605 (A). On the other hand, when read-modify is unnecessary (1604: No), the flow proceeds to processing 1607 (B).
(A)
The PDEV control program 304 transfers the compressed data including the data of read-modify target from the PDEV 110 to the buffer segment secured in processing 1603 (1605).

The data compression/decompression program 303 decompresses the compressed data transferred in processing 1605, and transfers only the data of a target of compression to the cache segment secured in processing 1603 (1606). Thereafter, the process proceeds to processing 1607 (B).
(B)
The data compression/decompression program 303 compresses the data on the cache segment and transfers the compressed data to the cache segment (1607). At this time, when read-modify is performed in addition to host write data, the data of read-modify target is compressed together. The result of processing 1602 is used as a compression unit.

The PDEV control program 304 transfers the data compressed in processing 1607 from the cache segment to the PDEV 110 (1608).

The LDEV control program 306 updates information (0902 to 0907) regarding the data storage position of the LDEV page management table 405 for the LDEV page corresponding to the data transferred to the PDEV 110 in processing 1608. The PDEV control program 304 updates the PDEV management table 401 for the total write capacity 506 and the operating time 508 of the PDEV 110 (1609).

The segment control program 302 releases the buffer segment secured in processing 1603. The cache segment management table 407 is updated, the state of the cache segment corresponding to the data stored in the PDEV 110 in processing 1608 is changed to clean, and the cache segment secured in other processing 1603 is released (1610). Thereafter, the processing ends.

FIG. 17 is a flowchart showing an example of the flow of the compression unit determination processing 1602 called from the flowchart described in FIG. 16. In the following description, it is assumed that one compression unit is selected from two compression units having different sizes. For example, a large compression unit is a 4-page LDEV page, and a small compression unit is a 1-page LDEV page.

The compression unit control program 307 acquires the size of compression target data (1701).

The compression unit control program 307 determines whether or not read-modify becomes necessary when a large size compression unit is used based on the information acquired in processing 1701 (1702). The determination method is the same as described above. That is, when a part of data necessary for compression in a compression unit of a large size is stored in the PDEV 110, read-modify is necessary, and otherwise, read-modify is unnecessary.

When read-modify is necessary (1702: Yes), the flow proceeds to processing 1703 (A). On the other hand, when read-modify is unnecessary (1702: No), the flow proceeds to processing 1707 (C).

(A)

With reference to the LDEV management table 403 and the PVOL management table 402, the compression unit control program 307 specifies the PDEV 110 belonging to the PVOL to which the write destination LDEV of the compression target data belongs (1703). In general, there are a plurality of PDEVs 110 belonging to the PVOL.

The compression unit control program 307 calls PDEV endurance determination processing 1704. The PDEV endurance can be known in several methods. As described later, with reference to the PDEV management table 401, it can also be estimated from the information of the writable capacity 505, the total write capacity 506, the scheduled operating time 507, and the operating time 508. Alternatively, information on the endurance of the PDEV 110 can be obtained from each PDEV 110.

Based on the result of processing 1704, the compression unit control program 307 determines whether or not each of the PDEVs 110 specified in processing 1703 is expected to reach the rewriting endurance within operating scheduled time (1705).

When any of the PDEVs is expected to reach the rewriting endurance within the operating scheduled time (1705: Yes), the flow proceeds to processing 1706 (B). On the other hand, when any of the PDEVs is expected not to reach the rewriting endurance within the operating scheduled time (1705: No), the flow proceeds to processing 1707 (C).

By referring to the rewriting remaining endurance and the preset operating scheduled time, it is possible to reduce the possibility that any PDEV reaches the rewriting endurance within the operating scheduled time. Note that it is not necessary to refer to the operating scheduled time. For example, a determination result as to whether or not the rewriting remaining endurance has reached a preset threshold may be referred to. This point is similar to determination in other steps referring to the operating scheduled time and the rewriting remaining endurance.

(B)

The compression unit control program 307 selects a compression unit of a small size and makes a response of this to the processing of the caller (1706). In other words, it is given to the data compression/decompression program 303 that the selected compression unit is a small size, and a compression unit of a small size close to the compression target data size is applied, and therefore it is determined that read-modify is unnecessary (1604). Thereafter, the processing is ended. Due to this, in a situation where the rewriting endurance of the PDEV is approaching, it is possible to avoid an increase in the write data amount by read-modify accompanying the application of the large size compression unit, and it is possible to reduce the possibility that the actual operating time of the PDEV 110 becomes shorter than the scheduled operating time.

(C)

The compression unit control program 307 selects a compression unit of a large size and makes a response of this to the processing of the caller (1707). In other words, the result of selecting the large size compression unit is given to the data compression/decompression program 303, and it is determined that read-modify is necessary (1604). This makes it possible to more efficiently use the storage area of the PDEV 110 by applying the large size compression unit under an environment where there is a margin for the rewriting endurance of the PDEV. Thereafter, the processing is ended.

Note that in the present example, the compression units to be used are described as two (large and small), but three or more compression units may be provided, and these may be controlled to be selectively used depending on the remaining amount of the rewriting endurance of the PDEV 110. For example, the sizes of the four compression units may be 1 LDEV page, 2 LDEV pages, 4 LDEV pages, and 8 LDEV pages. Each size of the compression units may be a power of 2.

For example, the compression unit control program 307 determines whether any of the corresponding PDEVs 110 reaches the rewriting endurance within the operating scheduled time sequentially from the largest compression unit. The largest compression unit in which all the corresponding PDEVs 110 do not reach the rewriting endurance within the operating scheduled time is selected.

Figure 17A:
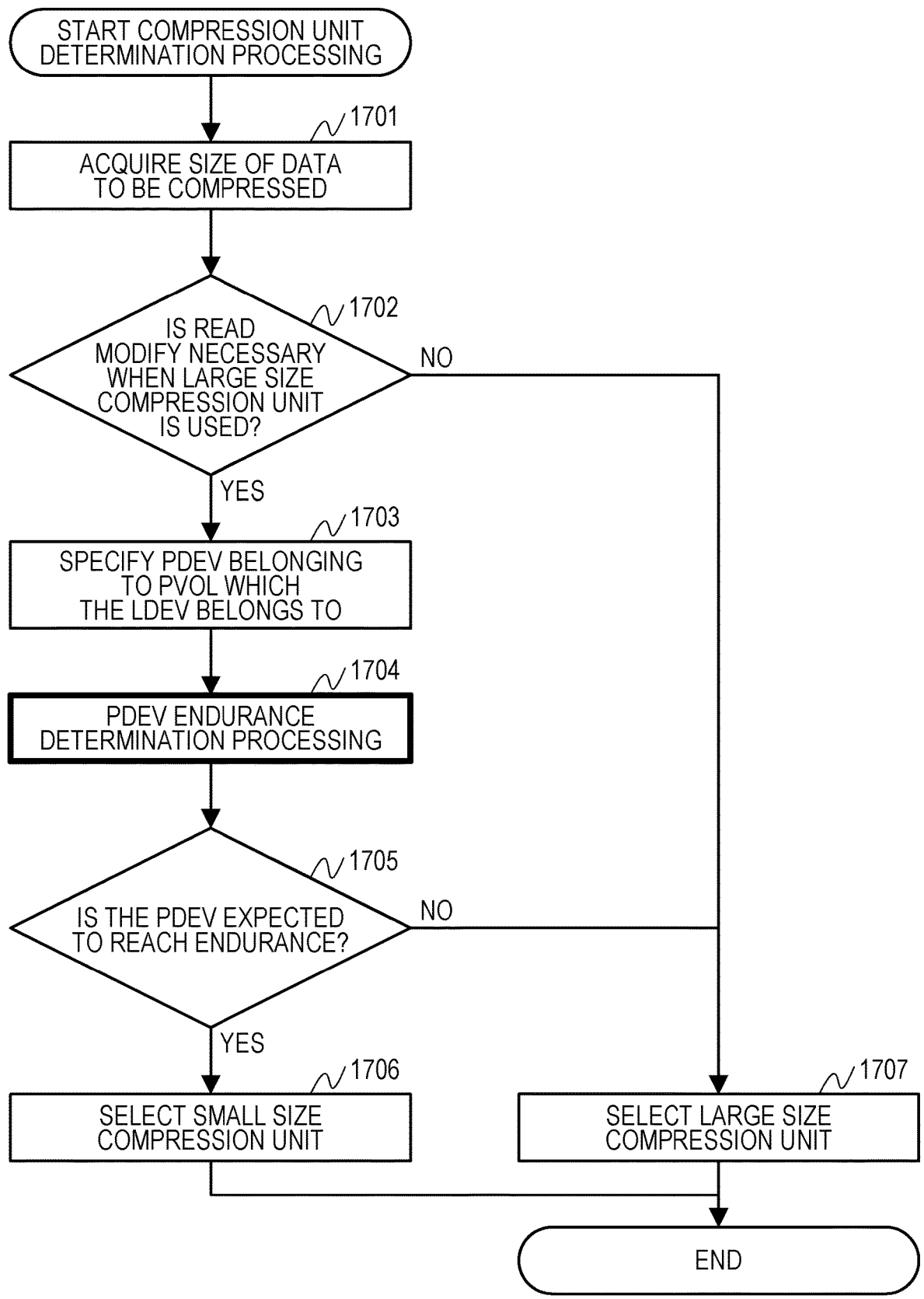
FIG. 17A is a flowchart showing an example of processing of determining a data compression unit in the storage system.

In the example shown in FIG. 17A, it is determined whether or not read-modify should be performed when a large size compression unit is applied (1702), and thereafter the PDEV remaining endurance determination (1704) is executed. This determination order can be interchanged. That is, the PDEV remaining endurance determination may be executed first, and then determination of application/non-application of read-modify may be performed.

Figure 17B:
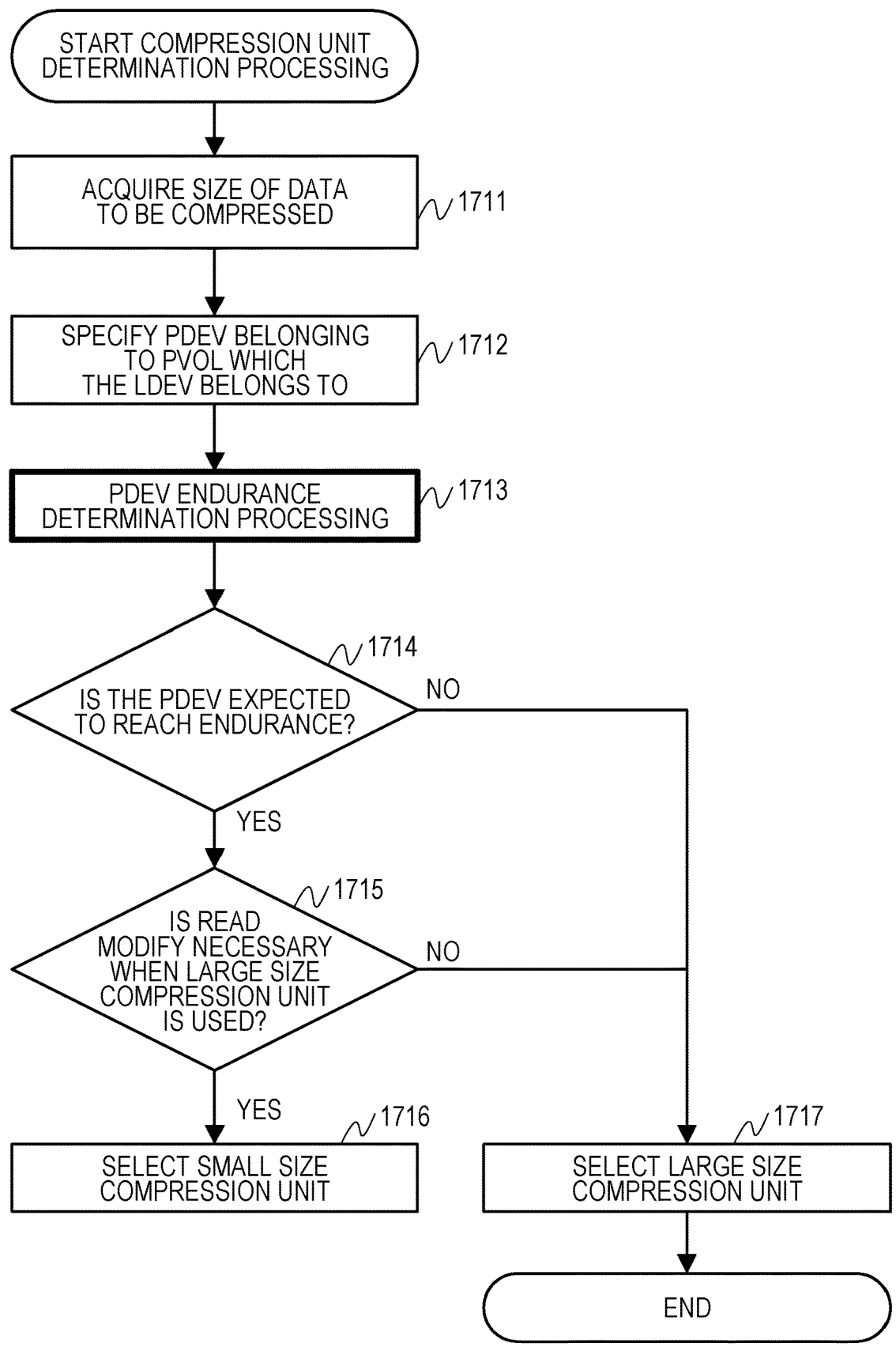
FIG. 17B is a flowchart showing another example of processing of determining a data compression unit in the storage system.

FIG. 17B shows a flowchart of the other example. Steps 1711 and 1712 are similar to steps 1701 and 1703 in FIG. 17A. In this processing method, after the PDEV endurance determination processing (1713) and the PDEV remaining endurance determination (1714) are executed, determination (1715) of application/non-application of read-modify is executed. In accordance with the determination results of the PDEV remaining endurance determination (1714) and the determination of application/non-application of read-modify (1715), a small size compression unit is selected (1716) or a large size compression unit is selected (1717). The determination result and the selection of the compression unit size are similar to the processing of FIG. 17A.

Compression efficiency (how much data can be reduced) qualitatively increases as the compression unit increases. Therefore, a compression unit 32 KB is statistically superior to 8 KB in terms of compression efficiency. However, when individual write data is actually seen, 32 KB is superior to 8 KB as an expected value but it is not reliable, regarding a point as to whether 32 KB compression is superior to 8 KB compression in the compression efficiency for the result after compression.

In the processing method shown in FIG. 17A, the large size compression unit is applied to data in which use of read-modify is inappropriate, and the large size compression unit in which the compression result is likely to be excellent is applied if the PDEV has a margin from the viewpoint of the remaining endurance even if data can be applied with read-modify. That is, it is an approach that makes it possible to also manage the remaining endurance while giving priority to a high compression efficiency. On the other hand, since the processing method shown in FIG. 17B is an approach of first performing the remaining endurance determination of the PDEV, priority is given to the remaining endurance management, and then the compression efficiency is appropriately managed.

Figure 18:
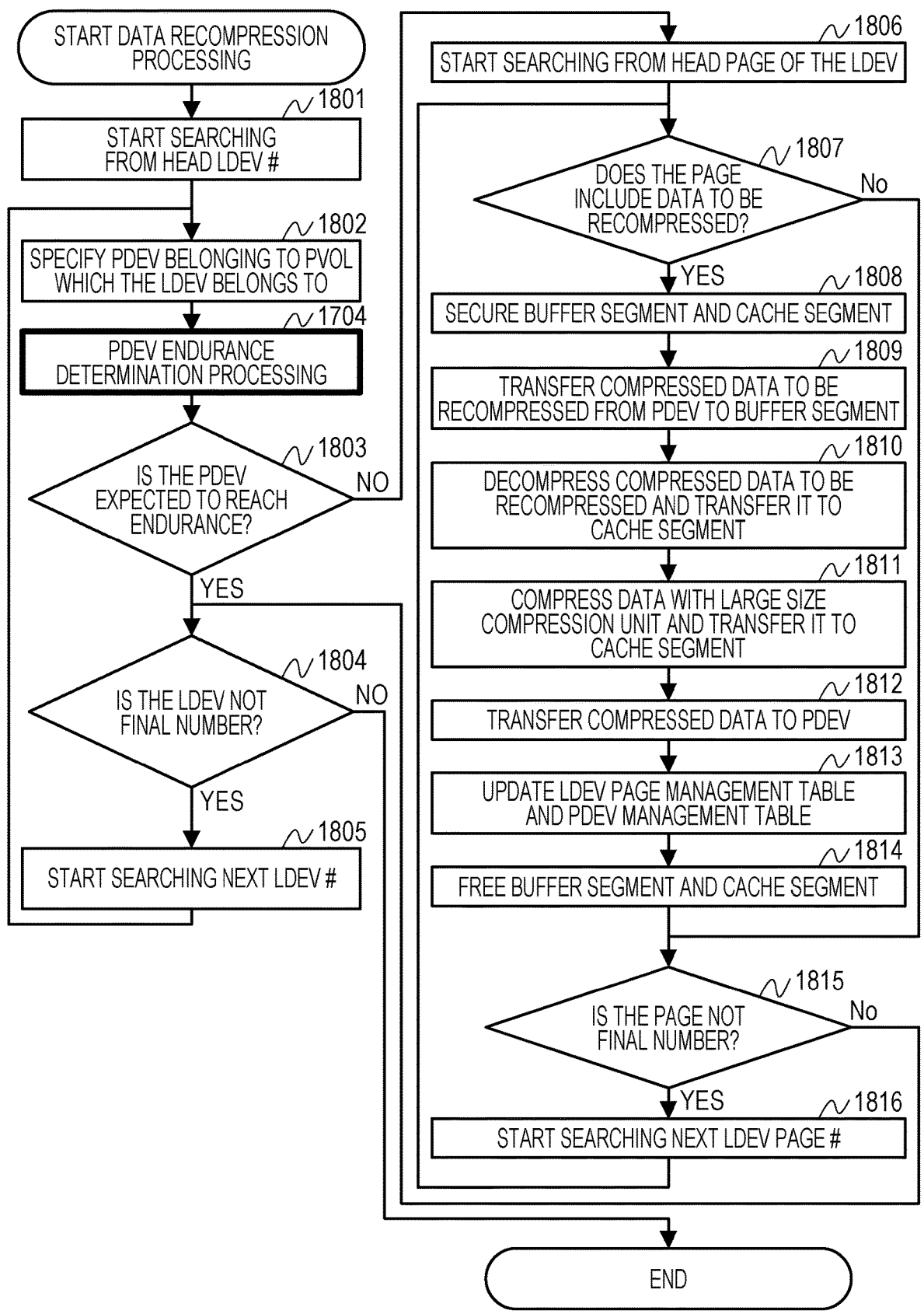
FIG. 18 is a flowchart showing an example of data recompression processing in the storage system.

FIG. 18 is a flowchart showing an example of the flow of the data recompression processing 1506 called from the flowchart described in FIG. 15. Note that the data recompression processing may be periodically executed. The data recompression processing enables efficient use of the storage area while suppressing the possibility of replacement before the operating scheduled time of the PDEV.

With reference to the LDEV management table 403, the compression unit control program 307 starts searching for a data recompression target LDEV in order from the head LDEV #701 (1801). Thereafter, the process proceeds to processing 1802 (A).

(A)

With reference to the LDEV management table 403 and the PVOL management table 402, the compression unit control program 307 specifies the PDEV 110 belonging to the LDEV #701 being processed (1802).

The compression unit control program 307 calls PDEV endurance determination processing 1704.

Based on the result of processing 1704, the compression unit control program 307 determines whether or not each of the PDEVs 110 specified in processing 1802 is expected to reach the rewriting endurance within operating scheduled time (1803). When any of the PDEVs is expected to reach the rewriting endurance within the operating scheduled time (1803: Yes), the flow proceeds to processing 1804 (B). On the other hand, when any of the PDEVs is expected not to reach the rewriting endurance within the operating scheduled time (1803: No), the flow proceeds to processing 1806 (D).

(B)

With reference to the LDEV management table 403, the compression unit control program 307 determines whether or not the LDEV #701 currently being searched is not a final number (1804). When the LDEV #701 currently being searched is not the final number (1804: Yes), the process proceeds to processing 1805 (C). On the other hand, when the LDEV #701 currently being searched is the final number (1804: No), the processing is ended.

(C)

With reference to the LDEV management table 403, the compression unit control program 307 determines a number to be searched next to the LDEV #701 currently being searched, and starts searching (1805). Thereafter, the process proceeds to processing 1802 (A).

(D)

With reference to the LDEV page management table 405 corresponding to the LDEV currently being searched, the compression unit control program 307 starts searching for an LDEV page for which data is recompressed in order from the head LDEV page #901 (1806). Thereafter, the process proceeds to processing 1807 (E).

(E)

The compression unit control program 307 determines whether or not recompressible data is included in the LDEV page #901 currently being searched (1807). Note that the recompressible data can be determined based on whether or not data compressed in a compression unit smaller than the compression unit of the maximum size among selectable compression units is included.

The determination as to whether or not recompression is possible is made for each LDEV page count for a large size compression unit including the LDEV page #901 being searched. For example, when the large size compression unit is four LDEV pages, determination is made for four consecutive LBA pages whose head is the LDEV page #901 being searched.

As a result of the determination, when the recompressible data is included in the LDEV page (1807: Yes), the flow proceeds to processing 1808 (F). On the other hand, when the recompressible data is not included in the LDEV page (1807: No), the flow proceeds to processing 1815 (G).

(F)

The segment control program 302 secures a free buffer segment and a free cache segment (1808).

The PDEV control program 304 transfers the compressed data of a recompression target from the PDEV 110 to the buffer segment secured in processing 1808 (1809).

The CTL 104 decompresses the compressed data of the recompression target and transfers it to the cache segment (1810).

The compression unit control program 307 compresses the data decompressed in processing 1810 using the large size compression unit and transfers it to the cache segment (1811).

The PDEV control program 304 transfers the data compressed in processing 1811 to the PDEV 110 (1812).

The LDEV control program 306 updates information (0902 to 0907) regarding the data storage position of the LDEV page management table 405 for the LDEV page corresponding to the data transferred to the PDEV 110 in processing 1812. The PDEV control program 304 updates the PDEV management table 401 for the total write capacity 506 and the operating time 508 of the PDEV 110 (1813).

The segment control program 302 releases the buffer segment and the cache segment secured in processing 1808 (1814). Thereafter, the process proceeds to processing 1815 (G).

(G)

With reference to the LDEV page management table 405 corresponding to the LDEV currently being searched, the compression unit control program 307 determines whether or not the LDEV page is the final number (1815). Note that the determination here is made for each LDEV page count for a large size compression unit including the LDEV page #901 being searched. For example, when the large size compression unit is four LDEV pages, determination is made for four consecutive LBA pages whose head is the LDEV page #901 being searched. When the LDEV page of the determination target includes the page of the final number (1815: Yes), the process proceeds to processing 1816 (H). On the other hand, when the LDEV page of the determination target does not include the page of the final number (1815: No), the process proceeds to processing 1804 (B).

(H)

With reference to the LDEV page management table 405 corresponding to the LDEV currently being searched, the compression unit control program 307 determines a number to be searched next to the LDEV page #901 currently being searched, and starts searching (1816). Note that the recompression processing is executed for each LDEV page count for a large size compression unit including the LDEV page #901 currently being searched. For example, when the large size compression unit is four LDEV pages, processing is performed for four consecutive LBA pages whose head is the LDEV page #901 being searched. In this case, the number to be searched next is a number in which 4 is added to the LDEV page #901 currently being searched. Thereafter the flow proceeds to processing 1807 (E).

The recompression processing can perform recompression while reducing the possibility of reaching the rewriting endurance within the operating scheduled time of the PDEV, and can improve the use efficiency of the storage area. Note that it is not necessary to refer to the operating scheduled time for determination on the presence or absence of recompression execution. For example, a determination result as to whether or not the rewriting remaining endurance has reached a preset threshold may be referred to. In this manner, the compression data of the recompression target can be determined based on the remaining endurance of the PDEV.

Figure 19:
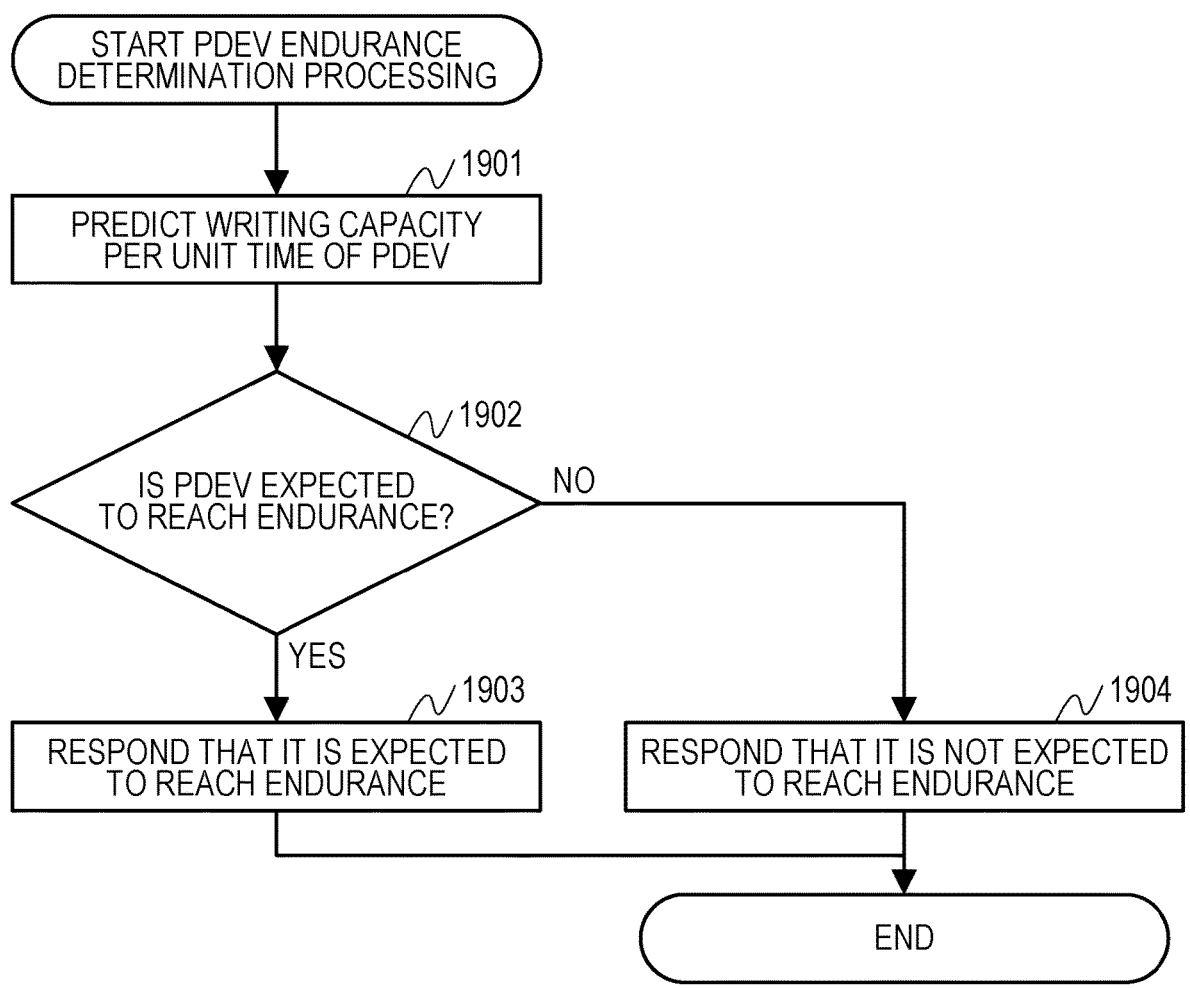
FIG. 19 is a flowchart showing an example of processing of determining the endurance of the PDEV in the storage system.

FIG. 19 is a flowchart showing an example of the flow of the PDEV endurance determination processing 1704 called from the flowchart described in FIGS. 17A, 17B, and 18.

With reference to the PDEV management table 401, the compression unit control program 307 calculates remaining operating scheduled time (obtained by subtracting the operating time 508 from the scheduled operating time 507) of the target PDEV. The writing amount per operating time is calculated with reference to the writable capacity 505 (1901).

The compression unit control program 307 determines whether or not the PDEV is expected to exceed the writable capacity 505 during the scheduled operating time 507 (whether or not the PDEV is expected to reach the endurance) based on the calculation result of processing 1901 (1902). If the PDEV is expected to reach the endurance (1902: Yes), the compression unit control program 307 responds that it is expected to reach the endurance (1903). On the other hand, if the PDEV is expected not to reach the endurance (1903: No), the compression unit control program 307 respond that it is expected not to reach the endurance (1904). Thereafter, the processing is ended.

Note that here, the write amount is used as an index for determining the endurance of the PDEV, but other means such as using an indicator value related to the endurance inherent to the PDEV may be used.

As described above, according to an example of the present description, it is possible to reduce the SSD maintenance and replacement frequency without increasing the ratio of SSDs that reach the rewriting endurance during the operating period of the storage system and to improve the data reduction ratio.

Note that the present invention is not limited to the example described above, and includes various modifications. For example, the above-described example has been described in detail for easy understanding of the present invention, and is not necessarily limited to those having all the described configurations. A part of the configuration of a certain example can be replaced by the configuration of another example, and the configuration of another example can be added to the configuration of a certain example. A part of the configuration of each example can be added to, deleted from, or replaced by another configuration.

Some or all of the above-described configurations, functions, processing units, and the like may be implemented by hardware, for example, by designing with an integrated circuit. The above configurations, functions, and the like may be implemented by software by a processor interpreting and executing a program that implements each function. Information such as a program, a table, and a file for implementing each function can be stored in a memory, a recording device such as a hard disk and a solid state drive (SSD), or a recording medium such as an IC card and an SD card.

The control lines and the information lines indicate what is considered to be necessary for the description, and do not necessarily indicate all the control lines and the information lines on the product. In practice, almost all the configurations may be considered to be connected to one another.

What is claimed is:
1. A storage system comprising:
a controller; and
one or more storage devices, wherein
the controller can compress data in different compression units, and collectively compresses data of one or a plurality of consecutive addresses in each compression unit of the different compression units, and
the controller
receives write data,
determines whether read of data stored in the one or more storage devices is necessary for compression of the write data by a first compression unit,
determines compression of the write data in the first compression unit in a case where the read is not necessary, and
determines compression by the first compression unit or compression by a second compression unit smaller than the first compression unit based on a remaining endurance of rewriting of the one or more storage devices in a case where the read is necessary.
2. The storage system according to claim 1, wherein
an address range in each compression unit of the different compression units is fixed.
3. The storage system according to claim 1, wherein
the controller determines compression in a second compression unit smaller than the first compression unit when determining that any storage device of the one or more storage devices reaches a rewriting endurance within a preset scheduled operating time.
4. The storage system according to claim 1, wherein
the second compression unit matches a write unit of the write data to the storage system.
5. The storage system according to claim 1, wherein
the controller determines a presence or absence of execution of recompression processing of data compressed in the second compression unit stored in the one or more storage devices based on a remaining endurance of rewriting of the one or more storage devices, and
the recompression processing includes:
reading, from the one or more storage devices, necessary compression data for compressing, in the first compression unit, data compressed in the second compression unit; and
decompressing the read necessary compression data, compressing the compression data in the first compression unit, and storing the compression data in the one or more storage devices.

6. The storage system according to claim 1, wherein
the controller executes recompression processing of compression data stored in the one or more storage devices; and the recompression processing includes:

determining whether each storage device of the one or more storage devices reaches a rewriting endurance within a scheduled operating time;

when determining that each storage device of the one or more storage devices does not reach a rewriting endurance within the scheduled operating time, determining, as a recompression target, data compressed in the second compression unit stored in the one or more storage devices;

reads, from the one or more storage devices, necessary compression data for compressing the recompression target in the first compression unit, and decompressing the necessary compression data having been read, compressing the compression data in the first compression unit, and storing the compression data in the one or more storage devices.

7. A data compression method in a storage system, the data compression method wherein the storage system can compress data in different compression units, and collectively compresses data of one or a plurality of consecutive addresses in each compression unit of the different compression units, and in the data compression method, the storage system receives write data, determines whether read of data stored in the one or more storage devices is necessary for compression of the write data by a first compression unit, determines compression of the write data in the first compression unit in a case where the read is not necessary, and determines compression by the first compression unit or compression by a second compression unit smaller than the first compression unit based on a remaining endurance of rewriting of the one or more storage devices in a case where the read is necessary.

8. The data compression method according to claim 7, wherein an address range in each compression unit of the different compression units is fixed.

9. The data compression method according to claim 7, wherein the storage system determines compression in a second compression unit smaller than the first compression unit when determining that any storage device of the one or more storage devices reaches a rewriting endurance within a preset scheduled operating time.

10. The data compression method according to claim 7, wherein the second compression unit matches a write unit of the write data to the storage system.

11. The data compression method according to claim 7, wherein the storage system determines a presence or absence of execution of recompression processing of data compressed in the second compression unit stored in the one or more storage devices based on a remaining endurance of rewriting of the one or more storage devices, and the recompression processing includes:

reading, from the one or more storage devices, necessary compression data for compressing, in the first compression unit, data compressed in the second compression unit; and decompressing the read necessary compression data, compressing the compression data in the first compression unit, and storing the compression data in the one or more storage devices.

12. The data compression method according to claim 7, wherein recompression processing of compression data stored in the one or more storage devices is executed; and the recompression processing includes:

determining whether each storage device of the one or more storage devices reaches a rewriting endurance within a scheduled operating time;

when determining that each storage device of the one or more storage devices does not reach a rewriting endurance within the scheduled operating time, determining, as a recompression target, data compressed in the second compression unit stored in the one or more storage devices;

reads, from the one or more storage devices, necessary compression data for compressing the recompression target in the first compression unit, and decompressing the necessary compression data having been read, compressing the compression data in the first compression unit, and storing the compression data in the one or more storage devices.

* * * * *